No. 646,587. Patented Apr. 3, 1900.
W. H. TUTTLE.
FIFTH WHEEL FOR VEHICLES.
(Application filed June 27, 1899.)
(No Model.)
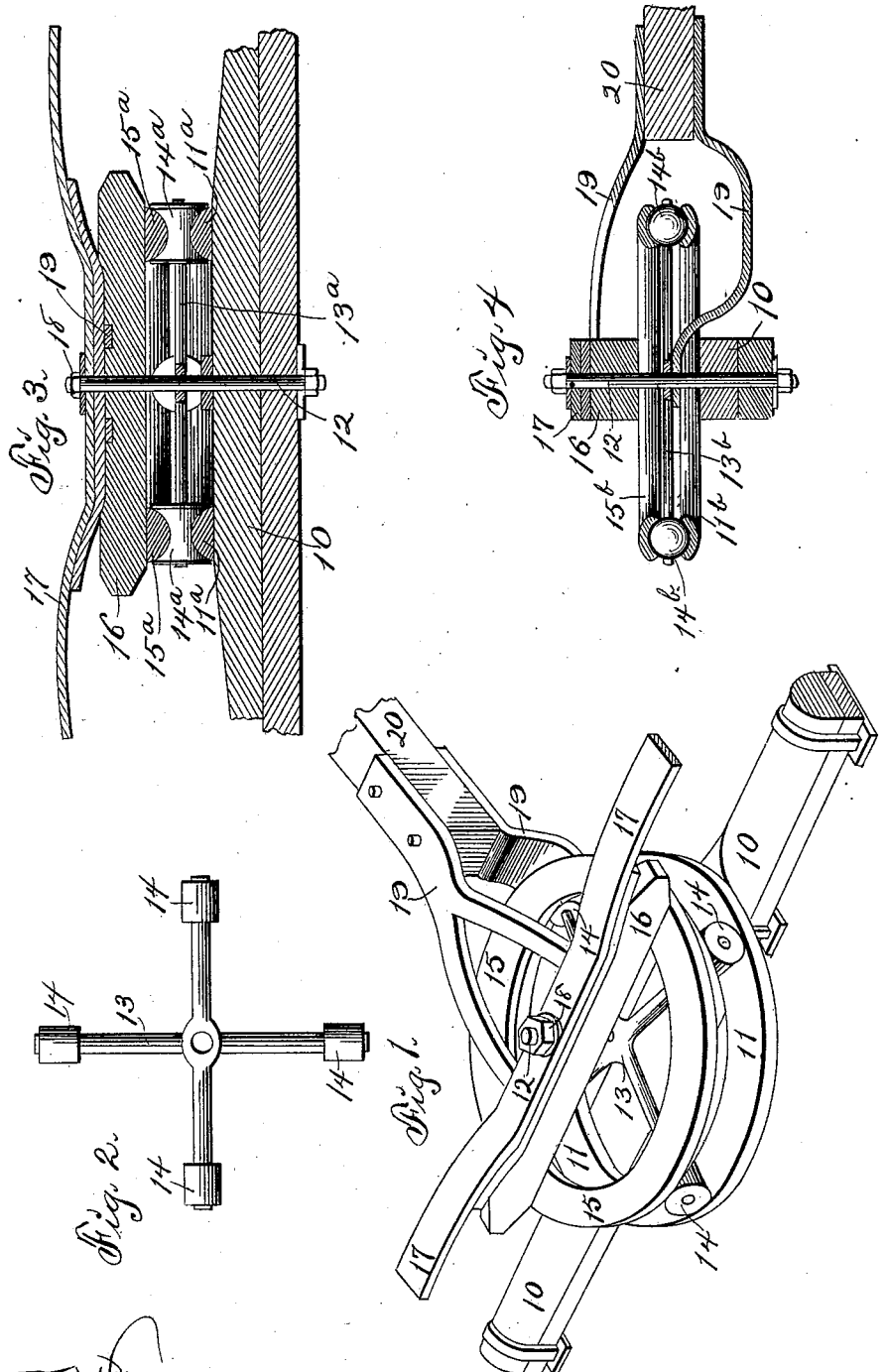
Witnesses:
F. C. Stuart.
R. S. Orwig.
Inventor:
William H. Tuttle,
By Thomas G. Orwig, Attorney.

UNITED STATES PATENT OFFICE.

WILLIAM H. TUTTLE, OF DES MOINES, IOWA.

FIFTH-WHEEL FOR VEHICLES.

SPECIFICATION forming part of Letters Patent No. 646,587, dated April 3, 1900.

Application filed June 27, 1899. Serial No. 722,036. (No model.)

*To all whom it may concern:*

Be it known that I, WILLIAM H. TUTTLE, a citizen of the United States, residing at Des Moines, in the county of Polk and State of Iowa, have invented a new and useful Fifth-Wheel for Vehicles, of which the following is a specification.

The object of this invention is to provide improved means for mounting the upper member of a fifth-wheel of a wagon for rotation to the lower member thereof, whereby friction between said members is avoided.

My invention consists in the construction, arrangement, and combination of elements hereinafter set forth, pointed out in my claim, and illustrated by the accompanying drawings, in which—

Figure 1 is a perspective illustrating the application of my invention to the fifth-wheel of a vehicle. Fig. 2 is a plan of the bearing-frame detached from the fifth-wheel. Fig. 3 is a vertical section illustrating a modified form of my device. Fig. 4 is a vertical section illustrating a further-modified form of my device.

In the construction of the device as shown in Figs. 1 and 2 the numeral 10 designates an axle, on the central portion of which is fixed the lower member or base-ring 11 of a fifth-wheel. A king-bolt 12 is mounted vertically in the center of the axle 10, and a four-armed spider 13 is mounted loosely on said king-bolt. Antifriction-rollers 14 are loosely mounted on the extremities of the arms of the spider 13 and engage the upper face of the member or base-ring 11 of the fifth-wheel. An upper member or ring 15 of the fifth-wheel is mounted on the rollers 14 parallel with the lower member or base-ring 11 and separated therefrom by said rollers. Spring-block 16 is mounted rigidly on the upper member or ring 15 on the fifth-wheel and carries a spring 17 in a common manner. The spring-block 16 and lower portion of the spring 17 are traversed by the king-bolt 12, and a nut 18 on said king-bolt serves to retain the several parts in their desired relations. Yokes 19 are fixed to the spring-block 16 and a coupling-rod 20 is fixed to the said yokes.

The upper yoke member has divergent branches at its front end that are adapted to be fixed rigidly to the block 16 to serve as braces and to vibrate with the block and the reach or coupling-rod 20, and the lower yoke member has a bolt-hole at its free end adapting it to be pivotally connected with the center of the spider 13 and the king-bolt 12, as required to serve as a support for the spider and to aid in retaining the two rings in concentric position with each other and the spider and to allow the spring-block 16, the reach or rod 20, and the upper ring to vibrate freely relative to the lower ring and the axle to which the lower ring is fixed.

In Fig. 3 I have illustrated the lower member or base-ring $11^a$ of the fifth-wheel formed with its upper surface convex in cross-section. In Fig. 3 I also show grooved rollers $14^a$ on the extremities of the arms of the spider $13^a$, said grooved rollers contacting with the convex surfaces of the rings.

In Fig. 4 I have illustrated the base-ring or lower member $11^b$ concavo-convex in cross-section and with its concaved face upward, and the upper member or ring $15^b$ concavo-convex in cross-section and with its concaved face downward. In Fig. 4 I show spherical rollers or balls $14^b$ on the extremities of the arms of the spider $13^b$, the spherical rollers or balls contacting with the concaved faces of the members of rings of the fifth-wheel.

In the practical operation of my invention the spider retains the rollers separated and arranges them for travel in the desired orbit, and the upper member being stationary with the box of the vehicle the lower member mounted on the axle may rotate freely and without friction upon the upper member. By thus using two mating rings that have no central parts to contact with each other all friction between the two mating and concentric parts is prevented and the minimum of friction incident to fifth-wheels is greatly reduced.

I claim as my invention—

A fifth-wheel for vehicles comprising a ring fixed to an axle, a mating ring fixed to a spring-block, a spider having radial arms and rollers journaled on the ends of the arms, a reach or coupling-rod having a yoke member fixed thereto and its front end fixed to the spring-block, a second yoke member fixed to the reach or coupling and its front end adapted to serve as a support for the spider above the axle and a bolt extended through the spring-block the end of the second yoke member and the axle in concentric position with the rings, all arranged and combined in the manner set forth for the purposes stated.

WILLIAM H. TUTTLE.

Witnesses:
P. L. FOWLER,
THOMAS G. ORWIG.